No. 608,158.  
W. PAINTER.  
BOTTLING MACHINE.  
(Application filed Jan. 12, 1895.)  
(No Model.)  
Patented July 26, 1898.  
10 Sheets—Sheet 1.

Fig. 1.

Attest:  
Howell Bertle  
Emma Marks

Inventor:  
William Painter  
By [signature]  
Attorney.

Fig. 6.

No. 608,158. Patented July 26, 1898.
W. PAINTER.
BOTTLING MACHINE.
(Application filed Jan. 12, 1895.)
(No Model.) 10 Sheets—Sheet 7.

Attest:
Howell Battle
Emma Marks

Inventor:
William Painter
By Wm C Wood
Attorney.

No. 608,158. Patented July 26, 1898.
W. PAINTER.
BOTTLING MACHINE.
(Application filed Jan. 12, 1895.)
(No Model.) 10 Sheets—Sheet 8.

Attest:
Howell Bartle
Emma Marks

Inventor:
William Painter
By Wm C Stroud
Attorney

No. 608,158. Patented July 26, 1898.
W. PAINTER.
BOTTLING MACHINE.
(Application filed Jan. 12, 1895.)
(No Model.) 10 Sheets—Sheet 9.

No. 608,158. Patented July 26, 1898.
W. PAINTER.
BOTTLING MACHINE.
(Application filed Jan. 12, 1895.)
(No Model.) 10 Sheets—Sheet 10.

Attests:
Howell Battle
Emma Marks

Inventor
William Painter
By his Attorney

THE NORRIS PETERS CO., PHOTO-LITHO., WASHINGTON, D. C.

UNITED STATES PATENT OFFICE.

WILLIAM PAINTER, OF BALTIMORE, MARYLAND, ASSIGNOR TO THE CROWN CORK AND SEAL COMPANY, OF SAME PLACE.

BOTTLING-MACHINE.

SPECIFICATION forming part of Letters Patent No. 608,158, dated July 26, 1898.

Application filed January 12, 1895. Serial No. 534,651. (No model.)

*To all whom it may concern:*

Be it known that I, WILLIAM PAINTER, of the city of Baltimore and State of Maryland, have invented certain new and useful Improvements in Bottling-Machines; and I do hereby declare that the following specification, taken in connection with the drawings furnished as a part of the same, is a clear, true, and complete description of the several features of my invention.

Machines embodying my present invention are adapted to the bottling of liquids with or without gaseous pressure and either with or without the charging of each bottle with syrup or with other flavoring or reinforcing liquids in appropriately varied and measured quantities.

Certain features of my invention relate to mechanism for measuring or gaging the flavoring liquids and delivering the same to bottles and also to the organization with said mechanism of means for controlling the delivery of the main or principal liquid, and, further, with means for controlling the snifting operation, which, otherwise stated, is a free discharge of small portions of air and gas during the filling of bottles. All of said features may be embodied in one organization and be quite independent of the character of the closures employed for sealing the bottles so long as said closures are capable of being applied to bottles within any suitably-inclosed space or filling-chamber which is traversed by the main liquid; but the means for gaging and delivering the flavoring liquid include novel features, which are quite independent of their organization with means for controlling either the delivery of the main liquid or the snifting operation.

Certain other features of my invention relate to a bottle-supporting cushion and to means for simultaneously and accurately alining and presenting two separate bottles, respectively, for the separate reception of the flavoring and the main liquid, these features being also independent of the bottle-closures employed.

Still another feature relates to the filling-chamber gasket and its controlling mechanism.

After fully describing my invention in detail and in connection with the drawings the several features thereof will be designated in appropriate clauses of claim hereunto annexed.

Referring to the drawings, of which there are ten sheets.

Figure 1:
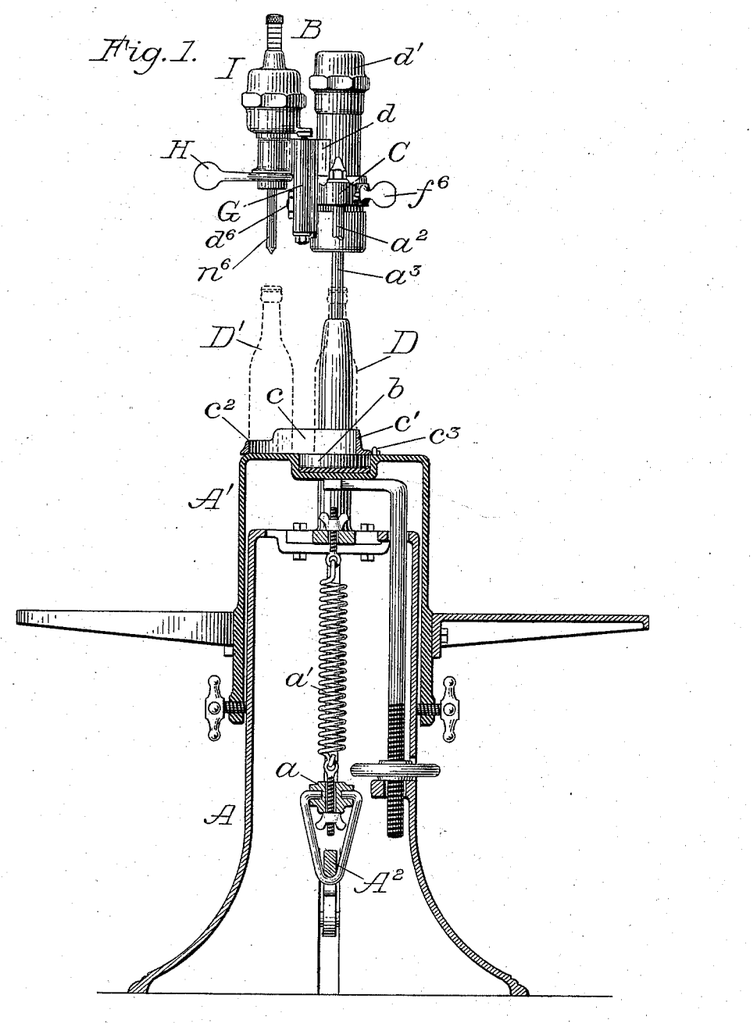
Figure 1 illustrates, partly in front view and partly in central vertical section, a machine embodying my present invention.
Figure 2:
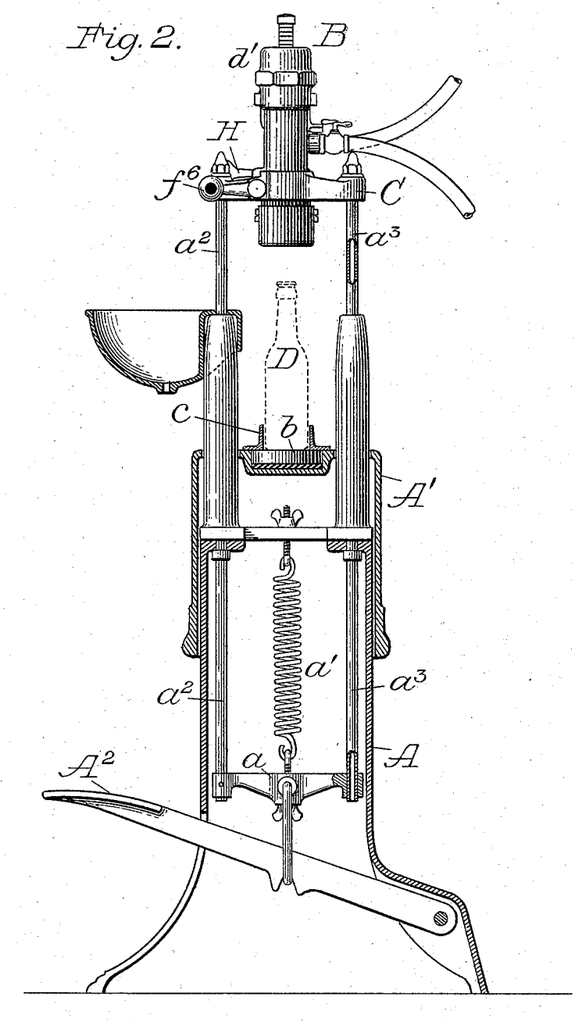
Fig. 2 illustrates the same partly in side view and section.
Figure 19:
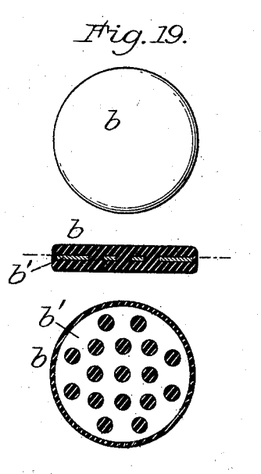
Fig. 19, in top view and in diametrical and in horizontal sections, illustrates the bottle pad or cushion which occupies the bottle-socket of the table.

Referring to the elevation and sectional views of the entire machine in Figs. 1 and 2, it is to be understood that the hollow base or standard A, the vertically-adjustable hood or table A' with its side wings, and the treadle $A^2$, the interior or lower cross-head $a$, and retractile spring $a'$ are substantially as heretofore disclosed in my Letters Patent No. 438,708, dated October 21, 1890. As heretofore, the cross-head $a$ is coupled to two sliding rods $a^2 a^3$, but in this machine the rod $a^3$ is hollow and serves as a part of a snifting-duct, as will be hereinafter fully described. The bottle-socket, centrally located in the top of the hood or table, is also as heretofore, but it is occupied by a bottle-supporting pad or cushion $b$ of novel construction, as specially shown in Fig. 19. This cushion is provided with a perforated metallic plate $b'$, centrally embedded in vulcanized-rubber compound. The perforations enable the practical union of the rubber at the two sides of the plate, so that both portions of the rubber operate together as one cushion in resiliency; but the plate prevents the underlying mass from being impaired by the inevitable wear and central annular depression of the upper mass, incident to the heavy contact with the cup-shaped bottoms of bottles, and when said upper mass has been rendered unfit for service the cushion may be turned bottom up, the worn portion then affording a good general bearing against the bottom of the socket, the plate $b'$ then affording a reliable flat abutment for the fresh side of the cushion. This pad has special value in machines wherein lip-sealing is performed, because of the heavy pressure necessary for compressing a sealing-disk preparatory to the setting of the metallic cap, by which the disk is secured and maintained in sealing contact with the lip of a bottle.

Figure 17:
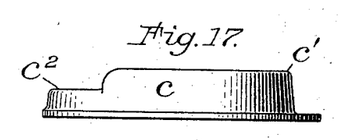
Fig. 17 is a side view of the two-bottle gage, by means of which bottles are made to register with the filling-chamber and with the syrup-nozzle.
Figure 18:
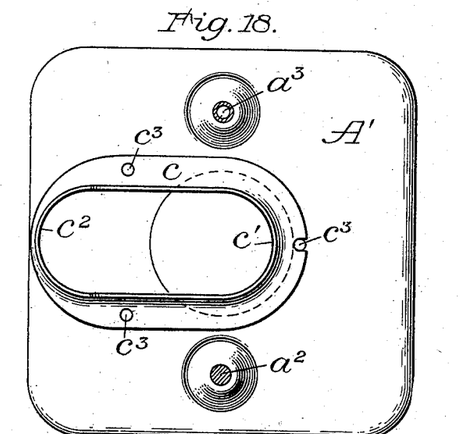
Fig. 18 is a top view of the table of the machine with the bottle-gage in position thereon.

There is also on the top of the table and in appropriate relation to the bottle-socket and its cushion a bottle-gage $c$, which is novel in that it is provided at one end with an interior gaging-surface $c'$ for gaging a bottle with reference to the gasket of the filler and at the other end with another gaging-surface $c^2$ for accurately gaging another bottle for the free reception into its mouth of a pendent syrup-delivering nozzle, as will be hereinafter fully explained. This bottle-gage is specially shown in Figs. 17 and 18, it being understood that several such gages will be required, each being adapted for use with and for properly alining bottles of a given diameter. The table is provided with dowel studs or pins $c^3$, which occupy holes in a flanged portion of the gage for accurately locating it in position, the several gages, although differing in width and length, having similar holes appropriately located, so as to receive said studs. The machine disclosed in my aforesaid Letters Patent was provided with a two-bottle gage, but it was U-shaped, and hence having but one gaging-surface for one bottle the second bottle could only be gaged in position by its sidewise contact with the first, and while that arrangement is sufficiently reliable on a throat or inside sealing machine for enabling one bottle to be registered with relation to the filling-throat and a second bottle to register with a snifting-nozzle, as in my prior machine, it would be unsafe to use such a gage in my present machine, as will hereinafter be made apparent.

In all bottling-machines the coöperative upper and lower portions—i. e., the filling-head and the bottle-supporting table—are of necessity normally so separated as to permit an interposed bottle to freely stand upright between them. In some cases the table with the bottle thereon is lifted to a stationary head, and in others the table and bottle are stationary and the head is lowered or forced into operative relations with the bottles, and it is to be understood that the several features of my present invention are equally applicable to machines wherein either of said modes of operation is involved, it being immaterial in what manner the bottle-supporting table and the filling-head assume approximating or coöperative relations or by what means the approximating action is or may be effected.

The head B of the machine is vertically reciprocated, it being in part composed of a cross-head C, which is carried upon the slidable rods $a^2$ $a^3$, as shown in Figs. 1 and 2; but said rods in this machine carry no slidable sleeves, as in the machine of my Letters Patent No. 438,708, and also as in my Patent No. 473,776, dated April 26, 1892. As disclosed in my said last-named Letters Patent, slidable sleeves on said rods serve for actuating the mechanism for automatically controlling the gasket at the entrance of the filling-chamber, this operation being performed by manipulating a hand-lever in my present machine, as will be hereinafter further described.

The cross-head C, as shown in Figs. 3, 4, 5, 6, and 10, is centrally provided with a vertical tube $d$, squared up at one side and provided with a screw-cap $d'$, thus affording a cylindrical chamber for the hollow piston $d^2$ and its spring $d^3$, this piston being in part tubular for the reception of the stem of a slidable cap-plunger $d^4$ and its spring $d^5$, the head of said plunger occupying the lower end of the tube $d$, which constitutes the filling-chamber at $e$.

Figure 3:
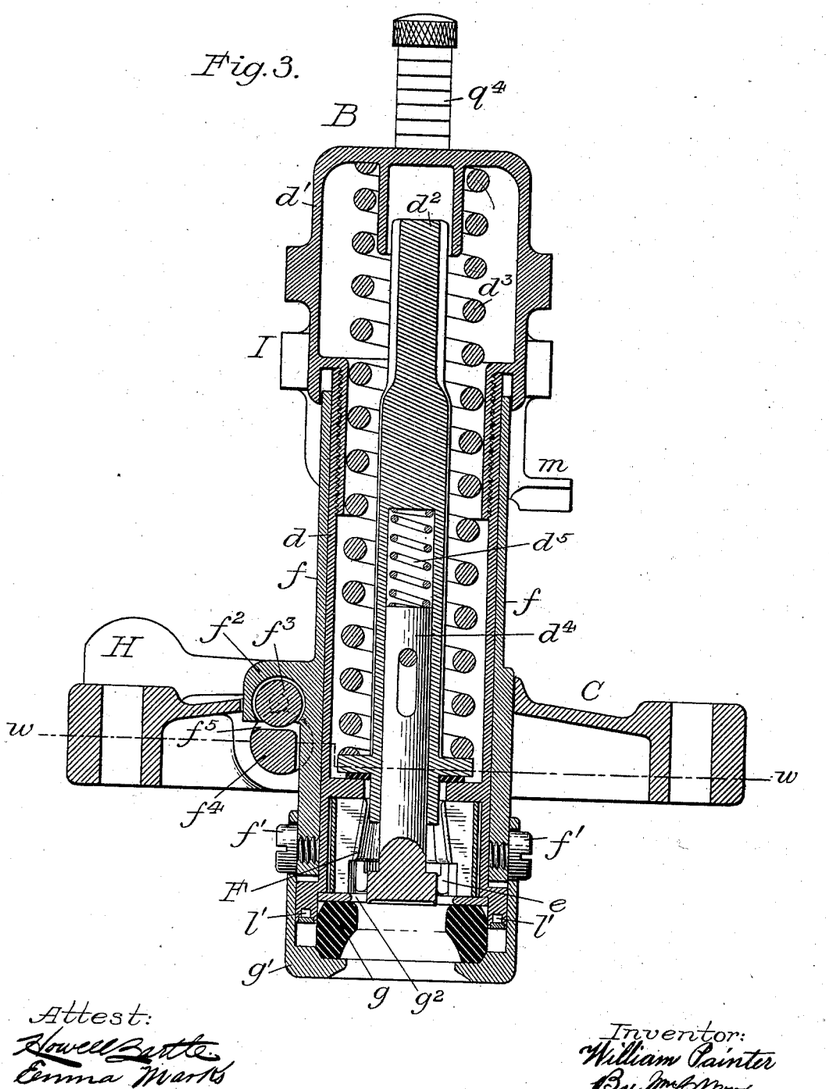
Fig. 3 illustrates the head of the machine in central section, its cross-head being in longitudinal section and with the gasket at the mouth of the filling-chamber in its inoperative condition.
Figure 7:
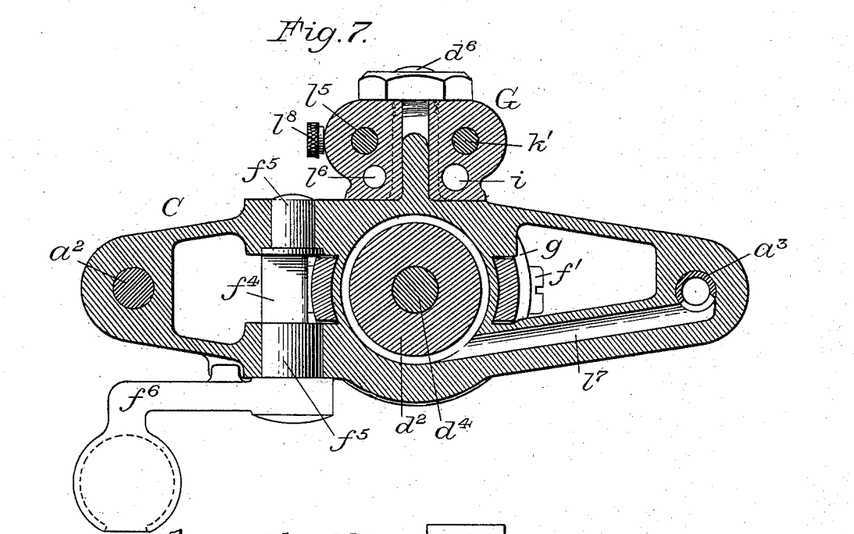
Fig. 7 is a horizontal sectional view of the cross-head which carries the gasket-controlling lever and the filling-head and showing a portion of the latter containing the stems of the filling-valve and snifting-valve with the adjacent ducts for filling and snifting, this view being in two planes on line *w*, Fig. 3.

The tube $d$ serves as a guide for an exterior slidable sleeve $f$, which is slitted at its lower end on account of adjacent portions of the tube or cross-head and so as to afford at said lower end, as shown in Fig. 3, tailpieces of proper thickness to receive screws $f'$ $f'$ for uniting to the sleeve an annular gasket-holder $g'$, having at its lower end an interior flange, between which and a stationary annular plate $g^2$ the annular gasket $g$ is located. As shown in Fig. 3, the sleeve $f$ has at one side a laterally-projecting lug $f^2$, containing an antifriction-roller $f^3$, which overlies a cam $f^4$ on a rock-shaft $f^5$, mounted laterally in the cross-head and provided with a hand-lever $f^6$, as further shown in Fig. 7, for compressing the gasket.

Figure 4:
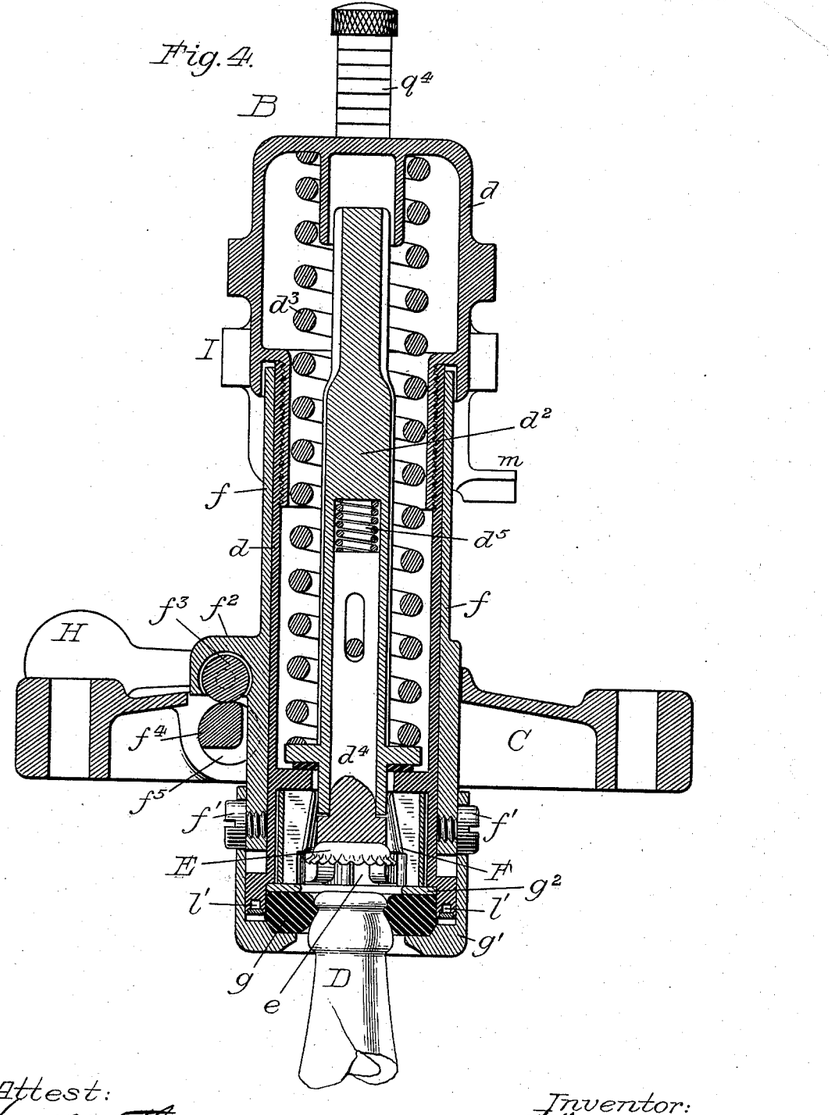
Fig. 4 in like manner illustrates the head of the machine with a sealing-cap in position in the filling-chamber, the gasket in its operative condition, and a bottle-head in packing engagement therewith.
Figure 6:
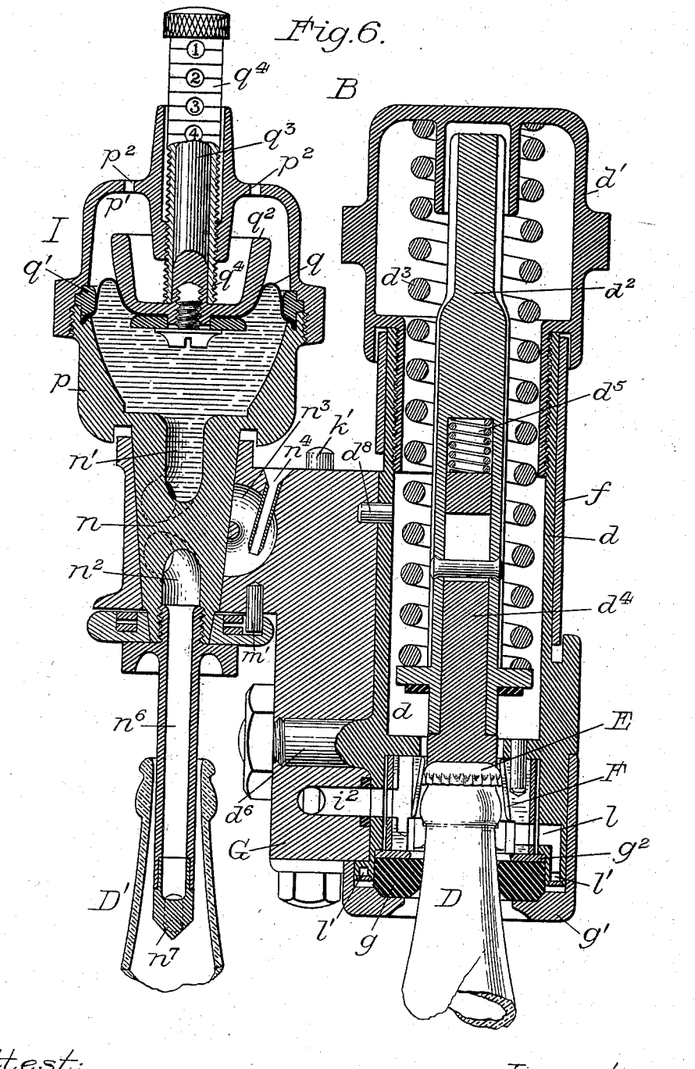
Fig. 6 is a view corresponding with Fig. 5, but with a bottle-head and sealing-cap within the filling-chamber, the sealing-disk within the cap being heavily compressed and the cap forced into locking contact with the bottle-head and showing the syrup-gage charged for the next delivery, the bottle occupied by the syrup-nozzle having already received its charge of syrup.

The gasket $g$ is annular and flat, and the normal vertical sectional dimensions of the body of the gasket are much greater than its normal lateral dimensions, and it is composed of very resilient vulcanized rubber. In my aforesaid Patent No. 473,766 I disclosed a funnel-shaped gasket having a heavy pendent lip, and its variable interior dimensions depended wholly upon raising or lowering this lip, as distinguished from the present gasket, which depends solely upon being actually compressed for reducing the area of its opening. Both gaskets, however, provide for a shifting contact with the bottle first near the lip of the bottle and then after a sliding contact engage with the neck below the head of the bottle D, as indicated in Figs. 4 and 6.

In my prior machine the gasket, being normally a pendent hollow cone, was merely flattened for receiving a bottle-head near its lip and during the shifting packing contact the gasket was inverted; but my present gasket maintains its shifting contact by mere resilience. Normally its opening is much larger than the metallic sealing-cap E, which is larger than the bottle-head, and vertical compression reduces said opening to such a degree that when thereafter it is forcibly engaged with a bottle-head it affords a gas-tight contact, which it maintains during the shifting contact, and also thereafter, with the neck of the bottle.

So far as I know this is the first instance in a bottling-machine of a flat annular non-sectional gasket and a cam-operated compressor or controller so organized that the interior dimensions of the gasket, being normally greater than the diameter of a bottle-head, can by mere flatwise compression of the gasket have its area of opening so reduced as to enable it to operate with shifting packing contact against the various different-sized portions of the head and neck of a bottle.

Within the filling-chamber $e$ is the cap-setting tool F, which, although differently constructed from any of those illustrated in my aforesaid Letters Patent No. 473,776, is a sectional hollow tapered tool, as therein indicated. This tool is separately illustrated in Figs. 14, 15, and 16, it being composed of eight segmental sections $h$, encircled by a flexible metallic band $h'$, so that in setting metallic sealing-caps the tool can adapt itself to such slight peripheral variations as are liable to occur in bottle-heads at the locking-shoulders, with which the flanges of the caps are made to engage. The tool is also provided with cap-supporting fingers $h^2$, as in my prior machines, for properly holding a cap within the filling-chamber while the cap-plunger is resting thereon, as shown in Fig. 4, while a bottle is being filled. The operation of setting the cap is as in my prior machines, the seal within the cap being heavily compressed by the hollow piston $d^2$ and its heavy springs $d^3$, which then become, in fact, operative portions of the cap-plunger, as illustrated in Fig. 6.

Figure 14:
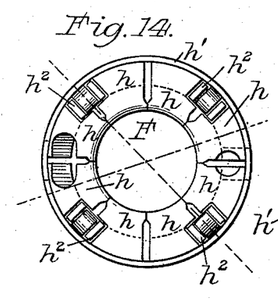
Fig. 14 is a top view of the cap-setting tool detached from the filling-chamber, and the same is shown in different sectional views in Figs. 15 and 16 on diametric lines, indicated in Fig. 14.
Figures 15, 16:
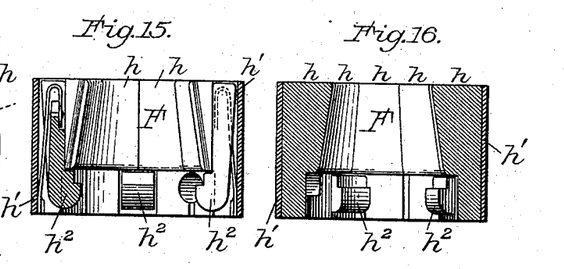

The cap-setting tool is provided with two diametrically opposite apertures, one serving as a part of the supply-duct to the filling-chamber and the other as a part of a snifting-duct, as clearly indicated in Figs. 6 and 14.

The supplying of liquid to the filling-chamber and the snifting of gas therefrom is controlled by means of valves located in what I will term a "valve-block" G, this being a specially formed and chambered block of metal, which is secured to the squared-up side of the cross-head tube $d$, by means of a bolt-stud $d^6$, occupying a hole $d^7$ in the block, coupled with a dowel-pin $d^8$, as clearly shown in Fig. 6, which occupies a hole $d^9$ in said block, this latter being shown in several views in Figs. 7, 8, 9, and 10.

Figure 5:
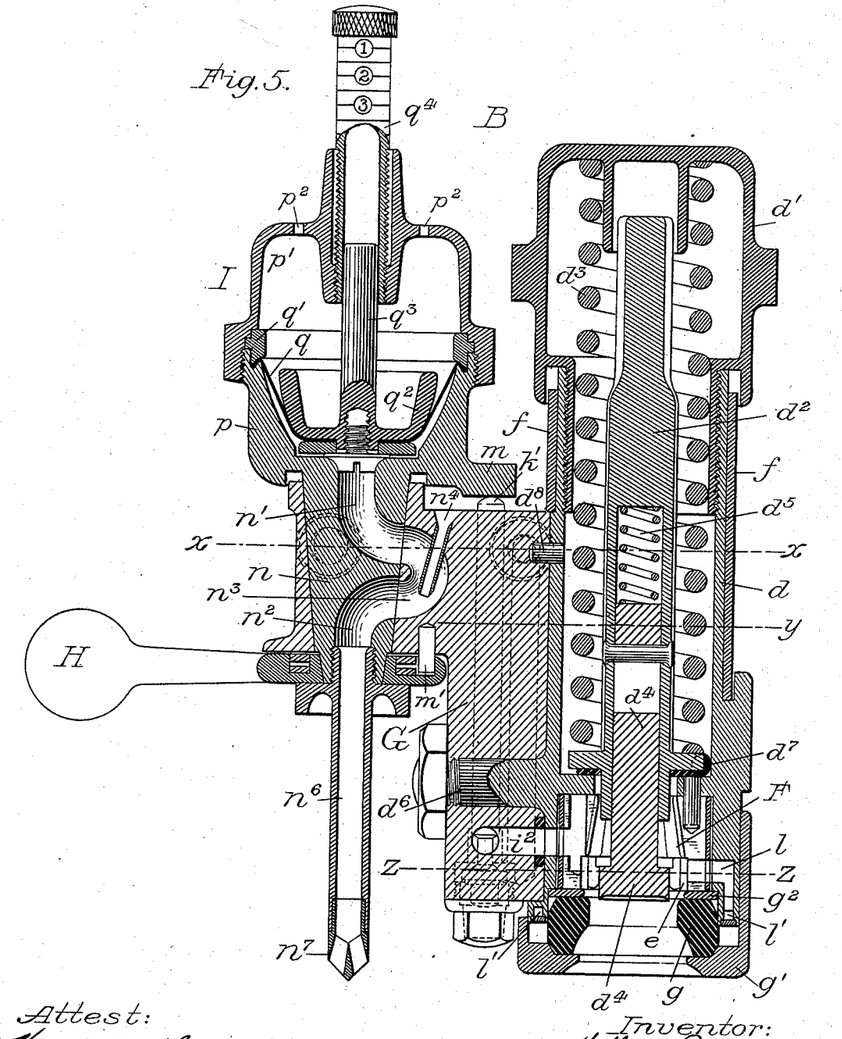
Fig. 5 is a central vertical sectional view of the head of the machine on a line at right angles to the cross-head, illustrating the syrup gaging and delivering apparatus, with the duct by which the main liquid passes to the filling-chamber indicated in dotted lines and the valve by which said liquid is controlled, said valve and the syrup-gage being opened as if for delivery, but with the filling-chamber in its normal condition and without a sealing-cap and bottle.
Figures 8, 9, 10:
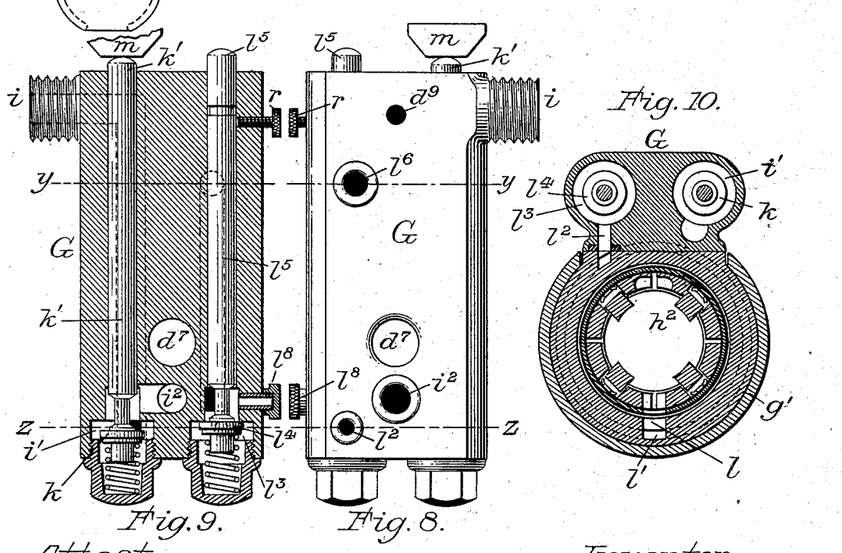
Fig. 8 is a view of the inner side of that portion of the head of the machine which contains the filling and snifting valves and their adjacent ducts. This portion will be termed a "valve-block.
" Fig. 9 is a sectional view of the part shown in Fig. 8 with the filling-valve opened and the snifting-valve closed.
Fig. 10 is a lateral sectional view of the filling-chamber on line z, Fig. 5, and of that portion of the head containing the filling and snifting valves on line z z, Figs. 8 and 9.

The liquid to be bottled enters by way of the nozzle $i$, descends through a vertical duct and passes laterally into a chamber $i'$, controlled by a spring-closed valve $k$, having a stem $k'$, projecting upwardly through the block, so that when said valve is opened, as shown in Fig. 9, the filling liquid passes into and through the lateral duct $i^2$, which enters the filling-chamber, as clearly shown in Figs. 5 and 9. Each of the duct-openings in the side of the block G is provided with an annular packing-ring, as clearly indicated in Fig. 8.

The snifting of air and gas from the filling-chamber is effected by way of a duct $l$ at one side, Fig. 6, thence downward to an annular duct $l'$, Figs. 5 and 10, and from the latter the passage is upward and then laterally through a duct $l^2$ in the valve-block, Fig. 10, to a chamber $l^3$, controlled by the spring-closed snifting-valve $l^4$, having a vertical stem $l^5$, which extends through the block G, Fig. 9. When said valve is open, the valve-chamber $l^3$ is placed in communication with a vertical duct, (shown in dotted lines in Fig. 9,) having a lateral exit at $l^6$, Fig. 8, into the cross-head tube $d$, as clearly indicated in Fig. 12, a free exit from said tube being afforded by way of a duct $l^7$ in the cross-head, Fig. 7, which communicates with the hollow rod $a^3$. The snifting exit-duct may terminate at the valve-block, if desired—as, for instance, at a capped nozzle $l^8$, Figs. 8 and 9, to which a pendent flexible tube may be attached, if desired—but I deem it preferable to extend said duct through the cross-head and sliding rod. It is to be understood that with my filling-valve and the snifting-valve, with the duct extending from the filling-chamber to any point above or beyond the snifting-valve $l^4$, the wasteful discharge of liquid is so slight as to be practically immaterial, either as to its value or as to rendering it objectionable when discharged upon the floor of a bottling establishment.

In describing the operation of the filling and snifting valves I will refer to Figs. 1, 8, 9, and 13 and state that although the lateral hand-lever H has other functions it is a lever by means of which said two valves are operated, and in such a manner that both cannot be opened at the same time. This lever is secured to a rotatively-mounted spindle having a laterally-projecting cam-faced lug $m$, so that on swinging said lever around about seventy degrees the cam will engage with the stem $k'$ of the filling-valve and depress it for opening the valve, as shown in Figs. 8 and 9. A further movement of said lever to about one hundred and ten degrees removes the cam-lug from the filling-valve stem and places it in operative relation with the snifting-valve stem $l^5$, the two working positions of the hand-lever and the cam-lug being indicated in dotted lines in Fig. 13. The rotative movement of the lever is restricted by suitable stops, one of which is a fixed stud $m'$. (Shown in Figs. 5 and 6.) It will be seen that the filling-duct between the valve $k$ and the filling-chamber, Figs. 5 and 6, is short and direct, and that the depressed location of the mouth of the bottle, Fig. 4, insures the passage of all the liquid into the bottle, and that whenever the gaseous pressure in the bottle equalizes that at the source of supply the lever H is to be moved to and fro quickly for momentarily opening the snifting-valve and affording the requisite discharge of air and gas, the filling-valve being then closed, to be again reopened for completing the filling operation.

A novel and valuable feature of my invention consists in combining with the filling-head a suitable chamber, (for the reception and delivery of syrup or other flavoring,) provided with a cock and a pendent nozzle, so that two bottles may be simultaneously presented to and appropriately charged by way of the nozzle and the filling-chamber through which the main liquid is delivered.

I have stated that the hand-lever H has functions other than operating the filling and the snifting valves, meaning thereby that said lever also operates a cock which controls the intermittent supply of syrup to the syrup-gage I and the delivery of syrup therefrom into bottles prior to their reception of the main liquid to be bottled. The rotative spindle before referred to, to which the hand-lever H is secured, serves not only as a part of the syrup-gage, but also as a two-way cock $n$, Figs. 5 and 6, consisting of a tapered plug fitting a suitable seat in a laterally-projecting portion of the valve-block G. This cock $n$ is provided with an upper vertical and laterally-curved passage $n'$ and a similar lower passage $n^2$, which communicate with each other when in registration with a vertical curved passage $n^3$ in the adjacent portion of the valve-block. A vent-tube $n^4$, projecting downwardly into the passage $n^3$, facilitates the downward delivery of syrup in passing through the cock.

Figures 11, 12:
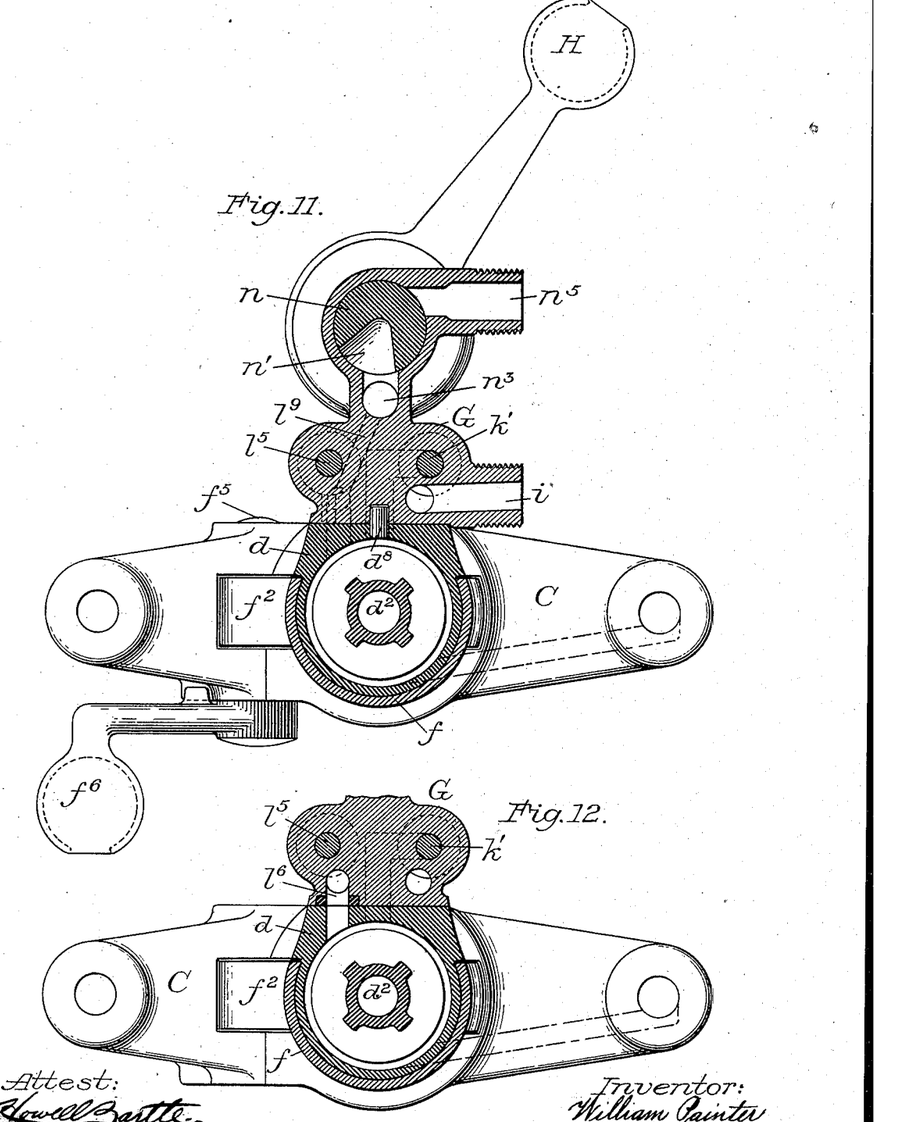
Fig. 11 is a top view of a part of the main cross-head and a sectional view of a portion of said cross-head and of the filling-head and also of the syrup-gage and showing the induction-nozzles through which the main liquid and the flavorings or syrup are supplied to the machine, as by means of flexible pipes provided with couplings and stop-cocks, this view being on line x, Fig. 5.
Fig. 12 is a top view of a part of the main cross-head and a sectional view of a portion of said cross-head and of the filling-head above the filling-chamber on line y, Fig. 5, and also of the portion which contains the filling and snifting valves on line y y, Figs. 8 and 9, for showing the communication between the snifting-duct and the interior of the dome of the filling-head.
Figure 13:
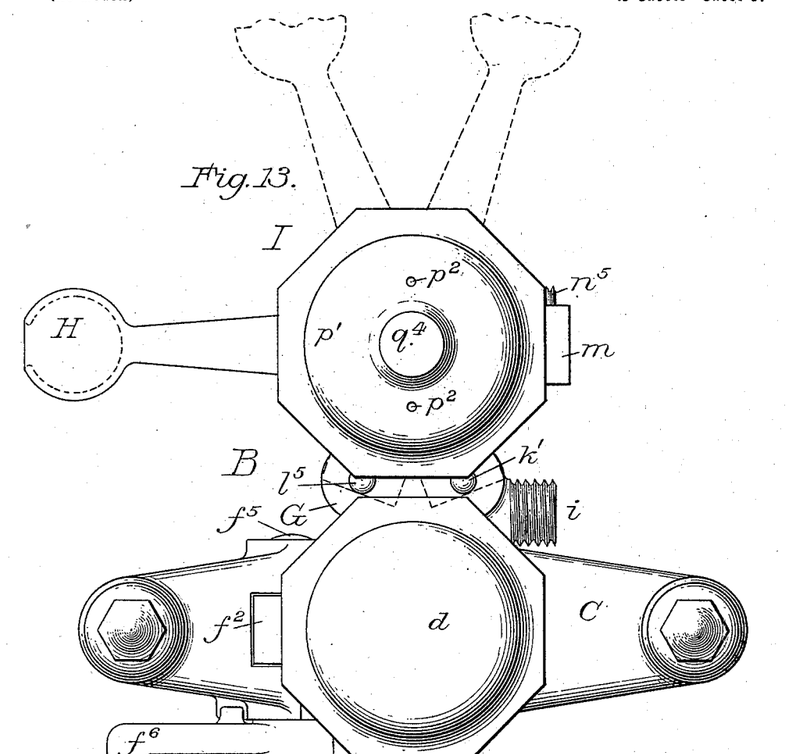
Fig. 13 is a top view of the head of the machine, showing the stems of the filling and snifting valves, the arm or lever by which the syrup is delivered and by which said valves are opened and with different working positions of said lever indicated in dotted lines.

At the one side of the cock-seat, in the block G, there is an induction-port $n^5$ in communication with the vessel (not shown) serving as the source of syrup-supply, said vessel either occupying an elevated position or having its contents under air-pressure for securing a reliable delivery to the syrup-gage I. This syrup-induction port $n^5$ is shown in Figs. 6, 11, and 13 and in dotted lines in Fig 5. When the cock $n$ has been turned so that its upper passage $n'$ registers with said port, syrup will freely enter and pass upwardly into the gage I, as shown in Fig. 6.

At the lower end of the cock $n$ there is a long nozzle or tube $n^6$, provided at its lower end with a tapered perforated tip $n^7$, which is preferably at its point composed of a practically non-corrosive metal, specially hard, as iridium, for enabling it to withstand injury from accidental contact with the lips of bottles, one of which is shown at D' in Fig. 6 and in dotted lines in Fig. 1.

The syrup-gage I includes a cup-shaped head $p$ on top of the cock $n$ and an inverted-cup-shaped screw-cap $p'$, provided with air-vents $p^2$ and with a central vertical tube internally screw-threaded at its lower end. The head $p$ and cap $p'$ afford an annular chamber separated into upper and lower compartments by a normally pendent frusto-conical flexible diaphragm $q$, tightly clamped at its edge by means of a ring $q'$ between the cap $p'$ and the head $p$. The diaphragm, at its center, is clamped by means of a screw and a washer to a suitable plunger $q^2$, provided with a central vertical stem $q^3$, said plunger serving as a weight for causing the diaphragm to promptly return to its normal position, Fig. 5, at the time of or during each discharge of syrup, said diaphragm (and its weight) being more or less lifted or inverted by the entering syrup, as shown in Fig. 6, when the cock is so turned as to admit syrup from the source of supply. The receiving capacity of the gage is varied by restricting the upward movement of the diaphragm, and this is accomplished by means of an adjustable stop, afforded by the hollow gage-screw $q^4$, which engages with the internal thread of the central tube of the cap $p'$ and is externally graduated to indicate liquid ounces and fractions thereof, the top of the tube of the cap $p'$ serving as a coöperative gage-line. The lower end of this gage-screw $q^4$ constitutes an adjustable abutment or stop with which the weight-plunger $q^2$ engages, and the interior portion of said hollow screw serves as a vertical guide for the stem $q^3$.

As shown in Fig. 5, the gage-screw is raised to its extreme upward position, and hence the diaphragm can rise to its full height and enable, say, four and one-half ounces of syrup to enter the gage, whereas, as shown in Fig. 6, the diaphragm can only rise far enough to admit, say, three ounces of syrup, the gage-screw having been correspondingly projected toward the diaphragm, it being obvious that in proportion as said screw is further lowered will the charge of syrup be lessened.

The operation of the machine has been fairly indicated in connection with the detailed description; but I will nevertheless now assume that the machine has been properly connected with vessels containing the filling liquid and the syrup or other matter desired for flavoring or reinforcing the main filling liquid. The operator places two bottles on the table, each in proper contact with its appropriate gaging-surface $c$ and $c^2$, as shown in Fig. 1, the bottles being shown in dotted lines at D and D'. The bottle D (already charged with syrup) is then in line with the filling-chamber and the empty bottle D' in line with the syrup-nozzle $n^6$. A metallic sealing-cap E is put into the filling-chamber, where it is supported, as heretofore, by spring-fingers, as shown in Fig. 4, the gasket $g$ then being fully open, as shown in Fig. 5. The gasket-controlling lever $f^6$ is then thrown upwardly for closing the mouth of the gasket inwardly to its fullest extent, its opening then being smaller than any portion of the bottle-head. The operator then forces the treadle-lever $A^2$ downwardly for depressing the filling-head until the gasket is lightly forced into engagement with the head of the bottle D, as shown in Fig. 4, the proper engaging movement of the gasket with the bottle-head below its lip being readily recognized by the operator because of the resistance at the treadle, due to the engagement of the gasket with the larger portion of the bottle-head. This same downward movement of the filling-head inserts the syrup-nozzle into the mouth of the second bottle D'. The operator then swings the lever H, which closes the syrup-induction port $n^5$, and then opens communication between the syrup-gage and the delivery-nozzle $n^6$ and empties its contents into the bottle D'. A still further movement of said lever H, without closing the syrup-delivery passage, opens the filling-valve $k$, and a still further movement of said lever permits the filling-valve to close, preparatory to quickly opening and closing the snifting-valve $l^4$ by a to-and-fro movement of said lever, which again opens the filling-valve. Upon properly charging the bottle D the lever H is returned to its normal position, Fig. 6, whereupon the filling-valve $k$ closes and the gage I receives its next charge of syrup. The operator then further depresses the treadle $A^2$ for forcing the filling-head farther downward, the gasket $g$ maintaining a shifting packing contact with the head of the bottle and then with its neck, as shown in Fig. 6, the lip of the bottle then being within the sealing-cap E, and the usual sealing-disk within said cap being under heavy pressure upon the lip of the bottle, and during the latter part of said downward movement of the head the hollow tapering setting-tool F forces the flange of the sealing-cap inwardly and bends it into locking engagement with an appropriate portion of the head of the bottle, thus completing the practically simultaneous operation of charging one bottle with syrup and another with the main liquid and gas, and then effectively sealing the latter bottle. The operator then pulls down the gasket-lever $f^6$, which releases the gasket from compression and restores its normal area of opening for freely releasing the capped bottle D upon the next rise of the filling-head. The filled bottle is then removed and a second one, charged with syrup, is moved into contact with its proper gaging-surface, below the filling chamber, and another bottle placed in position for receiving syrup, and so on, repeating the movements described.

On referring to Fig. 11 it will be seen that the passage $n'$ of the syrup-cock $n$ has a wide lateral mouth, and therefore syrup can be delivered from the gage I to a bottle without swinging the lever H far enough to open the filling-valve $k$, and also that by closing the usual tap-cock between the source of syrup-supply and the gage I the lever H can then serve only for controlling the filling and the snifting valves. For bottling liquids without gaseous pressure a continuous air-vent is desirable, in which case the snifting-valve can be opened and so held by means of a lateral screw $r$, Figs. 8 and 9, which can be made to engage with a notch in the snifting-valve stem when the latter has been properly depressed.

Figures 20, 21:
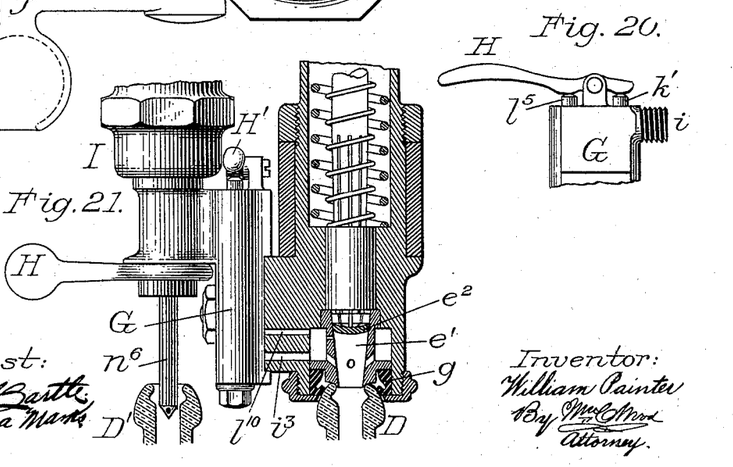
Fig. 20 illustrates a hand-lever restricted to operating the valves for filling and snifting.
Fig. 21 illustrates the application of certain portions of my invention to machines adapted to operate with rubber disks as throat-sealing devices.

The organization of separate valves and ducts and the control of the same for filling and snifting by a lever for opening either valve while the other is and must be closed is a novel and valuable feature, which is obviously not dependent upon the use of a laterally-movable lever nor one which also controls a syrup-gage—as, for instance, as illustrated in Fig. 20, wherein the two valve-stems $k'$ and $l^5$ are controlled by a rocking lever H', mounted on the valve-block and having a horizontal arm at each side of its pivot for engaging with and depressing either valve-stem, according to the movement of the lever by the operator.

I am aware that two-way cocks have heretofore been employed for double duty in filling and snifting and that with them the "snifting-way" cannot be opened until after closing the "filling-way," but with such cocks the snifting from the filling-chamber is by way of the one duct through which the filling liquid passes, and hence there is a liability of said duct being filled with liquid at the time of snifting, with a corresponding waste of liquid, which is avoided by my separate ducts and valves. A filling-cock and a snifting-valve, however, have been heretofore separately employed in one head, as disclosed in my Letters Patent No. 438,708, (hereinbefore referred to;) but therein the cock and valve were liable to be both open at the same time and the snifting-duct led immediately from an annular chamber always liable to be flooded with liquid, and hence there was such a liberal discharge of liquid during the snifting operation as to prompt my devising means for saving it, whereas with my present system of ducts and valves the waste of liquid and gas is reduced to practical insignificance, and even this may be saved, if desired, by connecting the snifting-duct $l^6$ in the valve-block with the curved syrup-passage $n^3$ by means of a diagonal duct, as indicated in Fig. 11 in dotted lines at $l^9$. The syrup-cock being always open and having a bottle at its nozzle during the snifting operation, the snifting liquid, if any, would pass downward into a bottle, as well as the gas, which being heavier than air would, at least in part, remain in the bottle. I have hereinbefore indicated that certain features of my present invention were independent of the character of the filling-chamber, as well as of the kind of bottle-closures or sealing devices employed—as, for instance, as illustrated in Fig. 21, wherein the syrup-gage and the block containing the valves for filling and snifting are organized with the head of a machine adapted to insert rubber sealing-disks into bottles, as disclosed in my aforesaid Letters Patent No. 438,708. In this instance the annular gasket $g^3$ requires no controller, because the head of a bottle is merely forced against its inclined inner surface and held there in gas-tight contact.

The filling-chamber $e'$ is afforded by a tapered tube, down which a rubber sealing-disk $e^2$ is forced after it has served as a top for the filling-chamber, as during the act of filling. As here shown, the filling-duct $i^3$ and snifting-duct $l^{10}$ communicate with ducts in the valve-block G, which is surmounted by a lever H', as in Fig. 20. The syrup-gage I is carried on the valve-block and is provided with a pendent nozzle $n^6$ and a controlling handle or lever H, as previously described.

Although two levers H and H' are here shown it will be obvious that the one operating-lever H may be common to the syrup-cock and to the valves, as in the organization first described.

Having thus described my invention, I claim as new and desire to secure by Letters Patent—

1. In a bottling-machine, the combination substantially as hereinbefore described, of a reciprocative filling-head adapted to receive the head of a bottle, and a syrup-chamber, mounted on said head, and provided with a separate pendent nozzle, and a suitable cock, whereby, during the filling of each bottle at the filling-chamber of the head, a second bottle may be internally occupied by the pendent nozzle and charged with syrup or other flavoring.

2. In a bottling-machine, the combination substantially as hereinbefore described, of a filling-chamber; a separate chamber for syrup provided with a pendent delivery-nozzle, and a suitable cock; a bottle-supporting table, and a two-bottle gage on said table, provided with separate gaging-contacts for alining two bottles, one with the filling-chamber, and the other, with the pendent nozzle.

3. In a bottling-machine, the combination of a filling-chamber provided with a suitable gasket; a syrup-chamber provided with a pendent nozzle, and a suitable cock; a valve for controlling the passage of liquid to the filling-chamber; means for operating said cock and valve; a table; a bottle-gage on said table, provided with separate gaging-contacts for accurately alining one bottle with the filling-chamber, and another bottle with said nozzle; and means for simultaneously causing the head of one bottle to engage with the gasket in packing contact, and the nozzle to be located within another bottle, substantially as described.

4. In a bottling-machine, the combination substantially as hereinbefore described, of a filling-chamber, an independent chamber for receiving and delivering syrup or other flavoring to a bottle, an independent discharge therefrom, a valve for controlling the passage of liquid to the filling-chamber, a cock for controlling the delivery of the flavoring, and an operating-lever common to said cock and valve.

5. In a bottling-machine, the combination substantially as hereinbefore described, of a filling-chamber; separate valves for controlling the delivery of liquid to said chamber, and the snifting of air or gas therefrom; a chamber for syrup or other flavoring, a cock for controlling the delivery of the flavoring, and a reciprocative operating-lever common to said cock, and to both of said valves.

6. In a syrup or flavoring gage, of a bottling-machine, the combination of a suitable chamber; a flexible weighted diaphragm within said chamber; a stop for limiting the filling movement of said diaphragm; a two-way cock, for controlling the induction of syrup from a suitable source of supply, and also the discharge of the contents of said chamber through a suitable pendent nozzle, substantially as described.

7. In the syrup or flavoring gage of a bottling-machine, the combination with a receiving-chamber, of a flexible diaphragm in said chamber, serving as a variable wall therein, and an adjustable stop, for variably limiting the movement of the diaphragm, and thereby varying the receiving capacity of the chamber, substantially as described.

8. In a bottling-machine the combination substantially as hereinbefore described, of a pendent filling-chamber containing means for setting metallic sealing-caps on bottles; an annular compressible gasket at the mouth of said chamber; a compressing device for said gasket, and a rocking cam-lever for operating the compressing device.

9. In a bottling-machine, the combination hereinbefore described, of a pendent filling-chamber containing means for setting metallic sealing-caps on bottles; a flat annular gasket at the mouth of said chamber; a slidable sleeve outside of said chamber, and underlying the gasket, and a rocking cam-lever for lifting said sleeve and heavily compressing the gasket, the latter having an area of opening normally larger than the diameter of the head of an appropriate bottle, and when compressed, adapted to initially engage in packing contact with a bottle-head below its lip and to progressively engage in shifting contact with the largest portion of the head, and then to maintain packing contact with the neck of the bottle below its head.

10. In a bottling-machine, the combination with means for setting metallic sealing-caps on bottles, of a bottle-supporting pad or cushion, composed of elastic rubber compound and an interior perforated plate, substantially as described, whereby after one surface of the pad has been rendered inoperative, because of the heavy pressures involved in sealing, the other surface will be kept intact, and be ready for use upon reversing the pad.

WILLIAM PAINTER.

Witnesses:
GEO. E. TAYLOR,
CHAS. O. SMICK.